June 14, 1949.　　　E. GORIN ET AL　　　2,473,472
MANUFACTURE OF CYCLOHEXENE
Filed April 15, 1946
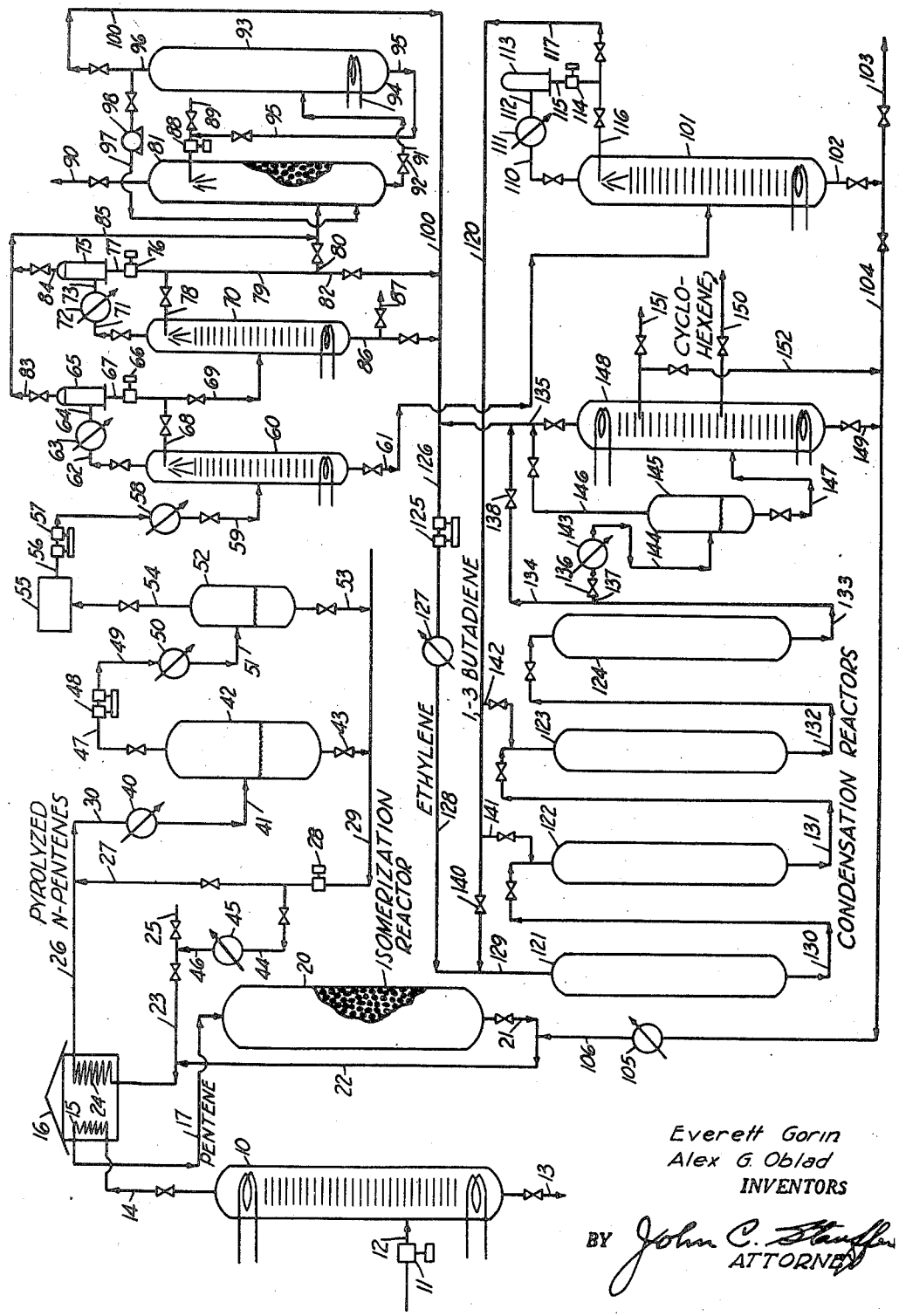
Everett Gorin
Alex G. Oblad
INVENTORS
BY John C. Stauffer
ATTORNEY Patented June 14, 1949

2,473,472

UNITED STATES PATENT OFFICE 2,473,472

MANUFACTURE OF CYCLOHEXENE

Everett Gorin and Alex G. Oblad, Dallas, Tex., assignors, by mesne assignments, to Socony-Vacuum Oil Company, Incorporated, New York, N. Y., a corporation of Texas Application April 15, 1946, Serial No. 662,154

2 Claims. (Cl. 260—666)

This invention relates to a continuous process for the production of cyclohexene from pentenes. In particular, this invention is concerned with the thermal synthesis of cyclohexene from a mixture of straight chain pentenes containing 2-pentene and 1-pentene in such relative proportions that upon pyrolysis approximate stoichiometric quantities of ethylene and 1,3-butadiene, hereinafter referred to as butadiene, suitable for thermal condensation to cyclohexene, are produced. By means of our process cyclohexene and alkyl derivatives of cyclohexene may be synthesized from olefinic hydrocarbon fractions consisting substantially of pentenes. The pentene fraction of cracked paraffin wax or cracked paraffinic naphthas, or the pentene fraction of Fischer-Tropsch naphtha produced from hydrogen and carbon monoxide over iron or cobalt catalyst is particularly suitable feed material to our process.

It is known to condense ethylene and butadiene to produce cyclohexene. Thus, Joshel in U. S. Patent No. 2,349,232 teaches a batch process wherein ethylene is condensed with a 1,3-diene such as 1,3-butadiene in stoichiometric proportion corresponding to one mole of butadiene per mole of ethylene. Since it is highly essential to maintain relatively high ratios of ethylene to butadiene in the condensation reaction in order to minimize dimerization of the butadiene and since substantial dilution of the reactants with non-reactive paraffinic hydrocarbons and with other olefins reduces the condensation reaction rate and the yield of cyclohexene product, it is highly desirable to utilize reactants of relatively high purity. The chief problem, therefore, in the manufacture of cyclohexene by the condensation of ethylene with butadiene is to obtain butadiene and ethylene of high purity without the use of elaborate and extensive fractionating equipment. Expensive low temperature fractionating equipment is usually required to concentrate the ethylene obtained in cracked gas streams. Likewise, very elaborate fractionating equipment heretofore has been used to isolate a C4 fraction containing a high percentage of butadiene.

It is the object of this invention to manufacture cyclohexene from olefinic hydrocarbons in a continuous process which utilizes a minimum of fractionating equipment. Another object of this invention is to manufacture cyclohexene from straight chain pentenes. Still another object of the invention is to manufacture cyclohexene from a mixture consisting essentially of 1-pentene and 2-pentene and containing at least one mole of 2-pentene for each mole of 1-pentene in said mixture. A further object of the invention is to provide a unitary continuous process for the manufacture of cyclohexene by the condensation of relatively pure streams of butadiene and ethylene prepared from straight chain pentenes in a cooperating pyrolytic decomposition step. Other objects of the invention will appear hereinafter.

We have found that mixtures of straight chain pentenes containing 1-pentene and 2-pentene in relative amounts within the range of from about 1 mole of 2-pentene to 1 mole of 1-pentene and 9 moles of 2-pentene to 1 mole of 1-pentene can be pyrolyzed at temperatures within the range of from about 725° C. to about 850° C. to decompose 80% of said pentenes and give a product containing at least 19 mole per cent of butadiene and an approximately equimolar per cent of ethylene. The yield of propylene on a mole basis is considerably less than the yield of ethylene and is of the order of about 10 mole per cent. Other components of the pyrolyzed product mixture consist of hydrogen and methane, the sum of the mole per cents of which is usually less than the mole per cent of butadiene or ethylene in the product. The pyrolyzed product contains a relatively small amount of paraffinic hydrocarbons other than methane and the C4 cut of the product gas usually contains at least 75% of butadiene.

As indicated hereinabove, the feed to the pyrolysis step of our process consists of straight chain pentenes, a major portion of which consists of 2-pentene. We prefer a pentene stream which is substantially free of branched chain pentenes. Since the pentene cut of most olefinic hydrocarbon naphtha streams predominate in 1-pentene we usually first subject the pentene cut to a catalytic isomerization step to convert at least a part of the 1-pentene to 2-pentene. We prefer to carry out this step in the presence of an alumina gel type catalyst prepared as described hereinafter. The isomerization may be carried out to produce equilibrium proportions of 2-pentene, that is, up to about 90 mole per cent of the straight chain pentenes without producing branched chain pentenes by secondary isomerization. The isomerized product, the 2-pentene content of which amounts to at least 50 mole per cent, preferably from about 60 to 75 per cent of the straight chain pentenes, is passed to a pyrolyzing zone maintained at a temperature of from about 725° C. to about 850° C., preferably from about 760° C. to about 820° C.

The pentene stream is pyrolyzed in the presence of from about 3 volumes to about 15 volumes of a diluent such as steam per volume of pentenes for a period within the range of from about 0.05 second to about 0.5 second, that is, at a reaction time in the pyrolyzing zone such that at least 40 per cent and not more than 80 or 90 per cent of the pentenes is reacted per pass through said zone. The total pressure in the pyrolysis zone should be within the range of from about atmospheric to about three atmospheres gage. The reaction product is quenched with water and fractionated to obtain relatively pure ethylene and butadiene streams containing substantially equimolar amounts of the two reactants for use in the condensation step of the process.

The butadiene is added to the ethylene vapor at a pressure of about 150 atmospheres in a condensation reactor or reactor system of any suitable type maintained at a temperature within the range of from about 300° C. to about 375° C., preferably from about 315° C. to 350 C. An internal ratio of ethylene to butadiene of at least 5 to 1 to 30 to 1 or higher is maintained in the condensation reactor.

The total residence time of the ethylene-butadiene mixture in the condensation reaction zone is a function of the temperature and pressure, that is, the residence time should be shorter the higher the temperature and pressure. In general, the residence time employed, expressed in hours, should be within the limits given by the expressions $$\frac{150}{P} \times 10^{0.54\left(\frac{573-T}{T}\right)} \quad \text{and} \quad \frac{600}{P} \times 10^{0.54\left(\frac{573-T}{T}\right)}$$

where P is the total pressure in atmospheres and T is the temperature in degrees Kelvin. Thus, if P=150 atmospheres and T=573° K. the residence time should be between one and four hours. A minimum residence time of about 0.04 hour, that is, 2.4 minutes in the reaction zone and a maximum residence time of about 10 minutes, is suitable when operating at about 300 atmospheres and 375° C. and a maximum residence time of about 8.5 hours is necessary when operating at 300° C. at a pressure of 70 atmospheres and at ratios of ethylene to butadiene within the range of from about 5 to 1 to about 30 to 1.

The product is passed to a fractionator for separation of cyclohexene, ethylene, unreacted components of the C₄ fraction and butadiene polymer. The unreacted components of the C₄ fraction, consisting mainly of 2-butene, and the butadiene polymer fraction are recycled to the pyrolysis zone for conversion to ethylene and butadiene. The ethylene is recycled to the condensation reaction zone. For the better understanding of our invention, reference may be made to the drawing which forms a part of this specification and represents diagrammatically one form of apparatus suitable for effecting the process of the invention.

Turning now to a detailed consideration of the drawing the liquid charge is introduced to fractionator 10 by means of pump 11 in line 12. This charge preferably consists of the straight chain olefinic fraction of a light naphtha obtainable from thermally cracked paraffin wax or from a mixture of synthetic hydrocarbons produced in the Fischer-Tropsch synthesis wherein a cobalt or an iron catalyst is used to convert a mixture of hydrogen and carbon monoxide to hydrocarbons. Dehydrogenated light naphtha, substantially free of butenes, may also be used as feed material to fractionator 10. The distillation range of the olefinic naphtha should include the pentene fraction and usually should lie within the limits of from about 20° C. to about 120° C. and the naphtha should consist substantially of straight chain olefins. The naphtha is fractionated in tower 10 to produce an overhead fraction consisting substantially of straight chain pentenes and a higher boiling olefinic fraction which is withdrawn as bottoms through line 13. Fractionator 10 is operated at pressures from about atmospheric up to three or four atmospheres gage. The straight chain pentene fraction passes overhead through line 14 to coil 15 in furnace 16 where it is heated to a temperature within the range of from about 200° C. to about 350° C. The hot pentene vapors pass from coil 15 to line 17 which leads to an isomerization zone 20. If the C₅ fraction contains an appreciable amount of paraffinic material it is desirable to remove the paraffins in an extractive distillation tower (not shown) before passing the C₅ olefins to the isomerization zone.

Isomerization zone 20 may suitably consist of a series of two or more reactors which are packed with a refractive-type catalyst which is selective for the isomerization of 1-pentene to 2-pentene. At least two reactors are manifolded in parallel in order that the catalyst in one of the reactors may be be operated on stream for the reaction cycle while the catalyst in the other reactor is being regenerated by oxidizing the carbon deposited thereon in said reaction cycle.

The reactors in reaction zone 20 are packed with an activated alumina catalyst. We prefer to use an alumina gel catalyst prepared from amalgamated aluminum according to the method described by Heard in U. S. Reissue Patent No. 22,196. Catalyst particle size within the range of from about 4 mesh to about 20 mesh may be used as packing in the towers in isomerization zone 20. The catalyst may be deposited in trays or it may be used in a continuous bed. This catalyst is particularly effective for the isomerization of 1-pentene to 2-pentene. Equilibrium conditions for the conversion are easily attained with minimum cracking, minimum polymer formation, and minimum secondary isomerization to branched chain pentenes.

When using the preferred alumina catalyst we prefer to operate the isomerization step of our process at temperatures within the range of from about 250° C. to about 350° C., preferably 275° C. to 300° C., and at space velocities within the range of from about 0.5 to 20 volumes of pentenes (liquid basis) per volume of gross catalyst space per hour. As indicated hereinabove, the extent of the isomerization of 1-pentene to 2-pentene in isomerization zone 20 is regulated to produce a mixture of 1-pentene and 2-pentene such that when the mixture is pyrolyzed approximately equimolar percentages of recoverable ethylene and butadiene are present in the pyrolyzed product. Hence, the choice of operating conditions within the above ranges is made to accomplish this result. Temperatures much in excess of 325° C. should be avoided, particularly when maintaining low space velocities, since the straight chain pentenes are readily converted to branched chain pentenes, such as trimethylethylene, at higher temperatures. The isomerization reaction is carried out at pressures of from about atmospheric to about three atmospheres gage.

As indicated above, we prefer that the pentene stream passing to the pyrolysis step of our process contain no branched chain pentenes. If branched chain pentenes are present, isoprene is formed and additional fractionation to remove the isoprene is then made necessary. Hence, if desired, the pentene stream before or after isomerization may be treated with an aqueous solution of sulfuric acid of from about 40 per cent to about 75 per cent acidity to remove branched chain pentenes from the pyrolysis zone feed stream. This may be accomplished in the manner described in our copending application entitled "Manufacture of dienes," Serial No. 651,015, filed February 28, 1946, (now abandoned) by directing the pentene stream in line 14 or in line 21 to a sulfuric acid-treating zone before passing to the isomerization step or to the pyrolysis step.

The isomerized product passes from zone 20 through lines 21 and 22 to line 23 which leads to the pyrolyzing coil 24 in furnace 16. In line 23 the pentenes are diluted with from about 3 volumes to about 15 volumes of an inert diluent, such as superheated steam, introduced to line 23 from line 25. In coil 24 the mixture of steam and pentene vapors is heated to a temperature within the range of from about 725° C. to about 850° C. The vapors pass through coil 24 at a space velocity such that they are subjected to a temperature within the above range for a contact time of from about 0.05 second to about 0.5 second. The term contact time as used in the specification and claims is calculated by dividing that volume of the reactor coil 24 which is maintained within the above temperature range by the total volume of pentenes and diluent entering the reaction coil per second, measured at standard conditions of temperature and pressure.

We prefer to operate the pyrolysis step of our process at such contact times in the pyrolysis zone that at least 40 per cent and no more than about 80 per cent of the pentenes is decomposed per pass through the heating zone in order to minimize the decomposition of 2-pentene to ethylene, propylene, and other non-condensable hydrocarbons, and also to minimize the condensation of the butadiene product to cyclic hydrocarbons. The pyrolyzed vapors pass from coil 24 to line 26 and are quenched with water introduced thereto from line 27 by means of pump 28 in line 29 which connect with line 27. The pyrolyzed mixture of hydrocarbon vapor and water vapor passes through line 30 to condenser 40 and thence by line 41 to gas separator 42.

In gas separator 42 condensed steam and any tarry product formed in the pyrolysis of the pentenes is separated from the gaseous hydrocarbon product of pyrolysis. The liquid condensate is sent to a tar separator (not shown in the drawing) and the water is recycled to line 27 via lines 43 and 29. At least a part of this water is withdrawn from line 27 and is passed through line 44 to steam generator 45. From generator 45 steam passes via line 46 to line 25 to be used as diluent of the pentenes undergoing pyrolysis in coil 24.

The vapor-overhead product from separator 42, which comprises pentene decomposition products, undecomposed pentenes, and water vapor, passes overhead through line 47. The vapors are raised to a pressure of from about 200 to 250 pounds per square inch by means of compressor 48 and are passed through line 49 to condenser 50 where additional water vapor is condensed. The mixture of vapors and water passes through line 51 to separator 52. Water is withdrawn from the bottom of separator 52 through line 53 which joins line 29. The vapors from separator 52 pass overhead through line 54 to drier 55 where residual water vapors are removed from the product mixture.

The dry gaseous mixture of hydrocarbons and hydrogen in line 56, which leads from drier 55, is picked up by compressor 57 and is passed to partial condenser 58 at a pressure of about 450 pounds per square inch. From condenser 58 the partially condensed product mixture passes through line 59 to fractionator 60, which is operated at a pressure of from about 400 to 450 pounds per square inch gage. A part of the hydrocarbon product may condense and form a separate layer in separator 52. This may be passed to fractionator 60 through a line (not shown) which connects separator 52 with line 59. The product is fractionated in fractionator 60 to produce a bottom draw-off stream consisting essentially of 1,3-butadiene, $C_4$ hydrocarbons other than 1,3-butadiene, unreacted pentenes, and small amounts of other heavier hydrocarbons, and an overhead vapor stream consisting of propylene, $C_2$ hydrocarbons, methane, and hydrogen. The higher boiling product is withdrawn through line 61 and passes to the butadiene recovery system described hereinbelow.

The overhead product from fractionator 60 passes through line 62, reflux condenser 63, and line 64 to reflux accumulator 65. Condensate in accumulator 65 comprising propylene, a small amount of ethane, and a part of the ethylene component of the product stream is withdrawn by means of pump 66 in line 67, a part of the liquid being returned through line 68 to tower 60 as reflux. The remainder of the liquid stream in line 67 is passed through line 69 to fractionator 70 for the separation of propylene from the $C_2$ hydrocarbons and lighter product. Fractionator 70 is operated at a pressure of from about 450 to 500 pounds per square inch. Vapor overhead from fractionator 70 consisting of $C_2$ hydrocarbons, a major proportion of which is ethylene and lighter product, passes through line 71 to condenser 72 and thence by line 7 to reflux accumulator 75. Condensate in accumulator 75 consisting substantially of ethylene and a small amount of ethane is withdrawn by means of pump 76 in line 77, and at least a part of the liquid is passed through line 78 to tower 70 as reflux. The remaining part of the liquid in line 77 is passed through lines 79 and 80 to ethylene absorption tower 81. If desired, at least a part of the ethylene stream in line 79 may be sent directly through line 82 to line 100 through which substantially pure ethylene is passed to the ethylene-butadiene condensation step of the process. The light overhead gaseous streams from accumulators 65 and 75, which contain hydrogen and ethane and a part of the ethylene from the product stream, pass through lines 83 and 84 respectively to line 85, which leads to line 80.

Liquid propylene is withdrawn from fractionator 70 through line 86. This product may be combined with the ethylene stream in line 100 with which line 86 connects. When propylene is combined with the butadiene in the condensation step of our process, 4-methylcyclohexene-1 is produced as well as cyclohexene. Since we prefer to produce relatively pure cyclohexene only, propylene from tower 70 is preferably withdrawn from the system through line 87, which connects with line 86. This propylene may be used as feed stock to an alkylation or polymerization process for the synthesis of valuable hydrocarbons.

The stream of light hydrocarbons and hydrogen in line 80 will contain from about cent to 50 or 55 mole per cent of ethylene, and it may contain as high as 5 mole per cent of propylene. The pressure on this stream may be released and the latent heat of vaporization of the liquid hydrocarbons may be supplied by the overhead stream from tower 60 and/or tower 70 thereby furnishing cooling means for condensers 63 and/or 72. In tower 81, which may suitably be packed with inert packing material, the stream of gas from line 80 is contacted at a temperature of from about 5° to 35° C. with an aqueous solution containing cuprous chloride introduced to tower 81 by means of pump 88 in line 89. Contact of the gas with this solution is made at pressures within the range of from about 3 atmospheres to about 30 atmospheres. The use of an aqueous solution of cuprous chloride for absorbing ethylene from a gas stream is described by Gilliland and Seebold in "Industrial and Engineering Chemistry," vol. 33, Sept., 1941, pages 1143–1147. The solution recommended by these authors should contain 3 gram moles of ammonium chloride per liter, approximately 2.5 gram moles of hydrogen chloride, and approximately 2 gram moles of cuprous chloride. Such a solution is particularly adaptable for the removal of ethylene from a pyrolyzed hydrocarbon stream since unstable copper acetylides are not formed in strong acid solution of the cuprous chloride. As the solution flows downward over the packing in tower 81, the ethylene is absorbed from the gas and the non-absorbed gases pass overhead through line 90.

The ethylene-enriched solution is withdrawn from tower 81 through line 91 and pressure release valve 92, and passes thence to desorption tower 93. The ethylene may be desorbed from the solution by the reduction of pressure on the solution and/or by the application of heat to the solution by means of steam coil 94 in the bottom of tower 93. Desorbed cuprous chloride solution is recycled from the bottom of tower 93 through line 95 which leads to line 89. If desired, a solution cooler (not shown) may be installed in line 95 in order to maintain the temperature of the solution within the range of 5° to 35° C. A relatively pure ethylene stream passes overhead from tower 93 through line 96, which joins line 100 leading to the condensation step of our process. If desired, a part of the relatively pure ethylene stream may be diverted through line 97 by means of blower or compressor 98 for introduction near the bottom of tower 81. The introduction of pure ethylene at a point in tower 81 below the point of introduction of the impure ethylene stream serves to strip the solution of any absorbed propylene and substitute therefor absorbed ethylene.

Returning now to the description of the recovery of butadiene from the stream of hydrocarbons in line 61, the mixture passes to fractionator 101, which is operated at a pressure of from about 5 atmospheres to about 10 atmospheres gage. The $C_5$ and higher boiling hydrocarbon fraction consisting substantially of undecomposed pentenes, that is, usually at least 80 mole per cent of undecomposed pentenes, is withdrawn from tower 101 through bottom draw-off line 102. A part of this fraction may be removed from the process through line 103; however, we prefer to recycle this fraction through line 104 and heater 105 wherein the fraction is vaporized and the vaporized fraction passes through lines 106, 22, and 23 to coil 24 in furnace 16. The vaporized $C_4$ fraction, at least 75 mole per cent of which is butadiene, passes overhead from tower 101 through line 110 to condenser 111 and thence through line 112 to reflux drum 113. A part of the liquid condensate from drum 113 is passed by means of pump 114 in line 115 through line 116 to be used as reflux in tower 101. The remainder of the condensate containing a relatively high per cent of butadiene is passed through line 117 to manifold feed line 120 which supplies butadiene to the condensation step of our process. A small amount of aniline or other volatile inhibitor may be added to the butadiene in line 120 in order to inhibit oxidation and polymerization of the butadiene in the condensation reactors.

The condensation apparatus, wherein ethylene and butadiene are condensed to form cyclohexene, may suitably consist of a multiplicity of high pressure reactors connected in series with the ethylene feed stream and in parallel with the butadiene feed stream. These reactors are represented by chambers 121, 122, 123, and 124 respectively. Ethylene in line 100 is picked up by compressor 125 in line 126. The compressed gas is passed through heater 127 where it is heated preferably to a temperature within the range of from 315° C. to 350° C. The heated gas passes through lines 128 and 129 to reactor 121. The ethylene is circulated through the reactor system in order to introduce a high concentration of ethylene therein before introduction of the butadiene. The gas passes from reactor 121 through line 130 to reactor 122, thence through line 131 to reactor 123, and thence through line 132 to reactor 124. From reactor 124 the ethylene stream passes through line 133, valved line 134, and line 135 to line 126, valve 136 in line 137 being closed. When the reactor system has been heated and pressured, valve 138 in line 134 is closed, and valve 136 in line 137 is placed in the open position. Valve 140 in line 120 is then opened to inject butadiene to the hot stream of ethylene vapor in line 129 leading to reactor 121.

We maintain an ethylene-to-butadiene ratio of at least 5 to 1 in reactors 121, 122, and 123. The ratio increases as the reaction mixture passes through the series of reactors. The temperature in the reactors is preferably maintained within the range of from about 315° C. to about 350° C. Pressure in the reactors may be from about 70 atmospheres to about 300 atmospheres, preferably about 150 atmospheres. The average residence time of the ethylene-butadiene mixture in reactor 121, when operating at 300° C. and about 150 atmospheres pressure, is within the range of from about 30 minutes to about 90 minutes. The reaction mixture passes as a continuous vapor stream to reactor 122 to which additional butadiene is added from line 141, which leads from line 120 and connects with line 130. The average residence time of the reaction mixture in reactor 122, which is maintained at approximately the same temperature and pressure as reactor 121, is within the range of from about 15 minutes to about 60 minutes. The reaction mixture passes through line 131 to reactor 123 which is maintained at about the same temperature and pressure as reactors 121 and 122. Additional butadiene may be introduced to reactor 123 through line 142 in order to maintain the ratio of butadiene to ethylene. The average residence time of the reaction mixture in reactor 123 is within the range of from about 10 minutes to about 40 minutes.

The reaction mixture passes from reactor 123 through line 132 to reactor 124. In reactor 124 residual butadiene in the mixed reactant gases is condensed with the ethylene. The residence time in reactor 124 will vary from about 5 to about 30 minutes and the reaction mixture passes through lines 133 and 137 to partial condenser 143 wherein butylenes, cyclohexene, and butadiene dimer are condensed from the gaseous mixture. The mixture of ethylene gas and liquid product passes through line 144 to gas separator 145. Ethylene is recycled from separator 145 through lines 146 and 135 to line 126. Liquid condensate from separator 145 passes through line 147 to fractionator 148.

Fractionator 148 is operated at a pressure of from about 5 to about 10 atmospheres for the separation of the liquid product from residual ethylene which passes overhead through line 135 to line 126. Butadiene dimer is withdrawn from fractionator 148 through line 149 which connects with recycle line 104. This butadiene polymer is vaporized in heater 105 and the vapor is recycled to coil 24 through lines 106, 22, and 23. Relatively pure cyclohexene product is withdrawn from fractionator 148 through line 150. A C4 stream consisting substantially of 2-butene is withdrawn from fractionator 148 through trapout line 151. If desired, this stream which may contain a small amount of butadiene may be recycled to coil 24 via lines 152 and 104, heater 105, and lines 106, 22, and 23.

As a specific example of the operation of our invention, 100 moles of straight chain pentenes, a major proportion of which consists of 1-pentene, may be isomerized to a mixture containing about 63 moles of 2-pentene and 37 moles of 1-pentene. This mixture is then pyrolyzed at about 800° C. to produce about 240 moles of gaseous product including about 50 moles of unreacted pentenes. Approximately 19 or 20 mole per cent of the 240 moles of product consists of ethylene and 19 or 20 mole per cent consists of butadiene. These two products can be condensed to produce about 20 moles of cyclohexene from the product of a single pass through coil 24 in furnace 16. By recycling the 50 per cent of unconverted pentenes approximately 40 moles of cyclohexene can be obtained from 100 moles of pentene feed to the process.

To recapitulate, our invention is particularly concerned with improvements in the method of preparing reactants for the production of cyclohexene. We utilize a pentene stream containing 1-pentene and 2-pentene in such proportions that when pyrolyzed the product will contain substantially equimolecular yields of ethylene and butadiene. These reactants are present in the pyrolyzed product stream in sufficient concentration to make possible their recovery and use in a relatively pure state in the condensation reaction to produce cyclohexene without the expenditure of large sums of money in fractionating equipment.

It will be understood that the flow diagram presented is merely illustrative of the possibilities and that other alternatives will be apparent to those skilled in the art in the light of this description and that our invention is not restrictive to the details shown. Thus, we may use a smaller number or a greater number of reaction chambers in the condensation step of our process. On the other hand, it will be understood that this flow diagram is simplified for the purpose of convenience and that various additional items such as pumping and compressing equipment, heat exchange equipment, control devices, and various other details are not indicated.

We claim:

1. The process for the manufacture of cyclohexene which comprises pyrolyzing a mixture consisting substantially of 2-pentene and from 25 to 50 mol percent of 1-pentene in the presence of from about 3 to about 15 volumes of steam diluent per volume of pentenes at a temperature within the range of from 725° C. to 850° C. for a contact time of from about 0.05 to 0.5 second to decompose from 40 to 90 mol percent of said pentenes and to produce substantially equal molar quantities of ethylene and 1,3-butadiene, separating and recovering the ethylene and 1,3-butadiene from the pyrolyzed mixture, and condensing the 1,3-butadiene and ethylene to produce cyclohexene.

2. The process for the manufacture of cyclohexene which comprises pyrolyzing a mixture of pentenes substantially free from branched chain pentenes and consisting substantially of 2-pentene and from 10 to 50 mol percent of 1-pentene in the presence of from about 3 to about 15 volumes of steam diluent per volume of pentenes at a temperature within the range of from 725° C. to 850° C. for a contact time of from about 0.05 to 0.5 second to decompose from 40 to 90 mol per cent of said pentenes and to produce substantially equal molar quantities of ethylene and 1,3-butadiene, separating and recovering the ethylene and 1,3-butadiene from the pyrolyzed mixture, and condensing the 1,3-butadiene and ethylene to produce cyclohexene.

EVERETT GORIN.
ALEX G. OBLAD.

REFERENCES CITED

The following references are of record in the file of this patent:

UNITED STATES PATENTS

| Number | Name | Date |
| --- | --- | --- |
| 2,349,173 | Joshel | May 16, 1944 |
| 2,366,126 | Pines | Dec. 26, 1944 |
| 2,396,416 | Frey | Mar. 12, 1946 |

Certificate of Correction

Patent No. 2,473,472                                                        June 14, 1949

EVERETT GORIN ET AL.

It is hereby certified that errors appear in the printed specification of the above numbered patent requiring correction as follows:

In the grant, line 4, and in the heading to the printed specification, line 6, State of incorporation, for "Texas" read *New York*; column 6, line 43, for "line 7" read *line 73*;

and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*